March 6, 1951   J. R. SWANTON, JR   2,544,474
HEATING SYSTEM
Filed Aug. 13, 1947   4 Sheets-Sheet 2
Fig. 2
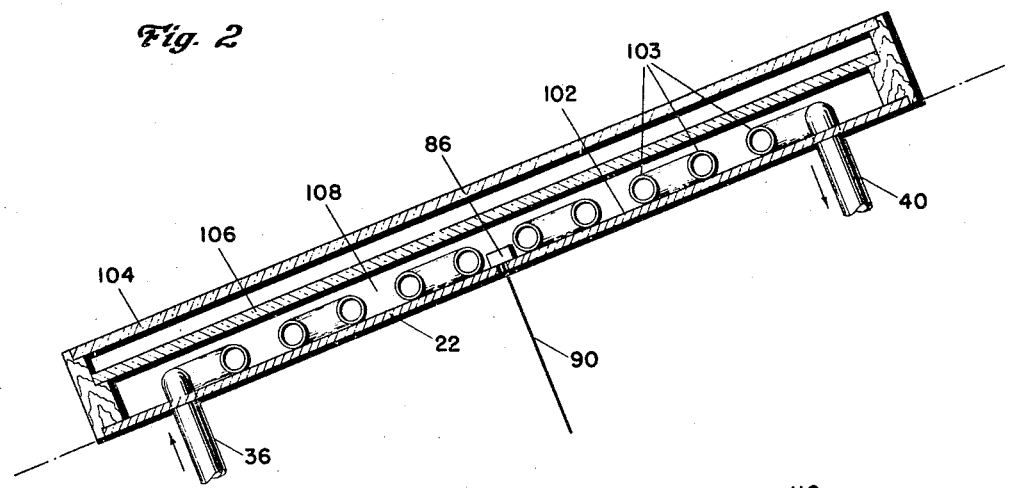
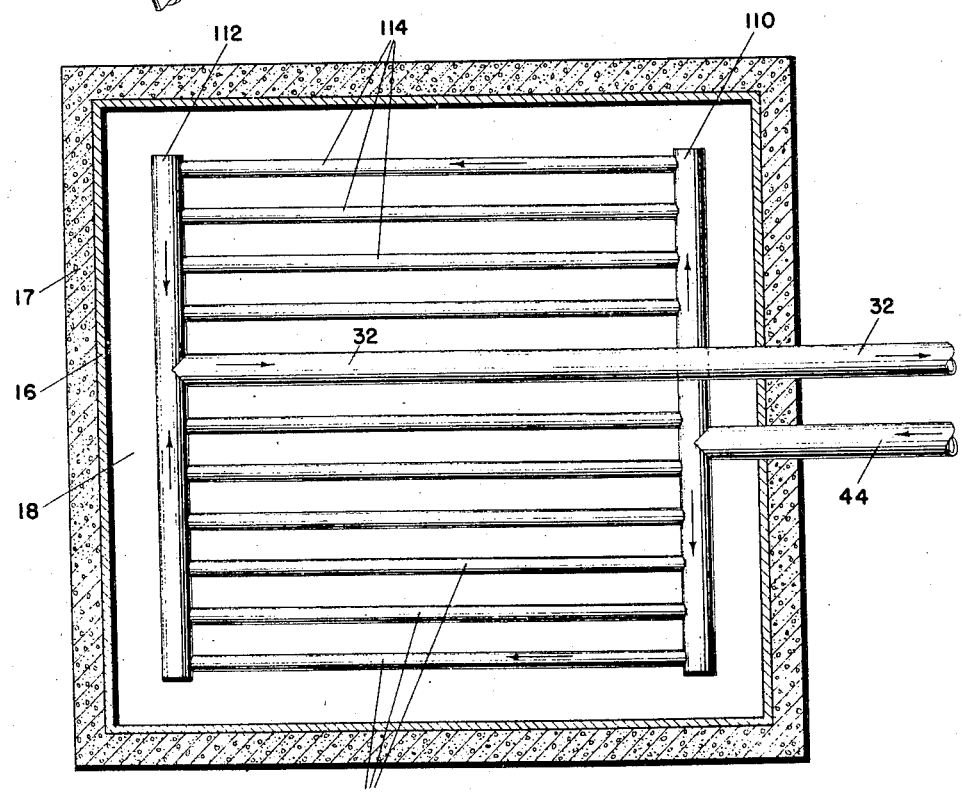
Fig. 3
Inventor:
John R. Swanton, Jr.
by: Frank N. Houghton
Agent March 6, 1951  J. R. SWANTON, JR  2,544,474
HEATING SYSTEM
Filed Aug. 13, 1947  4 Sheets-Sheet 4

Inventor:
John R. Swanton, Jr.
by: Frank N. Houghton
Agent

Patented Mar. 6, 1951

2,544,474

UNITED STATES PATENT OFFICE 2,544,474

HEATING SYSTEM

John R. Swanton, Jr., Newton, Mass., assignor to Arthur D. Little, Inc., Cambridge, Mass., a corporation of Massachusetts Application August 13, 1947, Serial No. 768,389

9 Claims. (Cl. 237—1)

This invention relates to the heating of dwellings and other buildings, and is directed in particular to heating such buildings by means of the latent and sensible heat which is available in a stored medium and which has been imparted thereto by exposure to solar energy.

This invention makes it possible to do away with the necessity for using coal, oil, gas, or other fuels—or electrical heat—in the heating of dwellings and other buildings. The system of this invention, once it is installed, operates continuously the year round, substantially without either upkeep cost or attention except for oiling a motor or turning a valve occasionally. Consequently the costs of fuels or electricity for heating, and of repairs and maintenance of more or less expensive heating plants, is eliminated. So are nuisances such as dusty fuels, smoke, disposal of ashes, etc.

The purposes of this invention are accomplished by providing a medium which has a melting point (which may also be referred to as its fusion point or as its freezing point) sufficiently above normal room temperature, and which is stable under the conditions of operation herein described, is substantially inert toward the equipment with which it is used, has a relatively high latent heat of fusion, and is relatively inexpensive. This medium is the heat storage medium of the present invention. Very few substances answer these requirements. The substance which most fully answers the foregoing requirements, I have found to be hydrated disodium orthophosphate, $Na_2HPO_4.12H_2O$, and this I prefer for the purposes of the present invention. Another medium which may be used for these purposes is hydrated calcium chloride, $CaCl_2.6H_2O$. While the latter is less expensive than the hydrated disodium orthophosphate, it has a lower latent heat value and a lower fusion temperature. Hydrated sodium sulfate, $Na_2SO_4.10H_2O$, which is another medium having most of the requirements for these purposes (although having somewhat less favorable latent heat characteristics than those of hydrated disodium orthophosphate), is not, however, considered to be a desirable medium, because of its tendency to precipitate on repeated melting and freezing.

To be suitable for the purposes of this invention, the heat storage medium should have a transition point (liquid to solid and vice versa) of at least about 85° F. for ordinary house heating, or more generally, it should have a transition point of at least 10° F. and preferably at least 15° F. above the temperature of the dwelling or other space to be heated. Lower transition points result in such small temperature differentials between heat storage medium and space to be heated that heat is not effectively transferred, or that excessively large radiation surfaces and amounts of heat storage medium are required. Also, the latent heat of fusion of the heat storage medium should be substantial, at least about 60 gram calories per cubic centimeter. A lower latent heat value means that excessively large amounts of the heat storage medium will usually be required to store sufficient heat for the purposes of this invention. Furthermore, as a practical matter, the heat storage medium must have good enough heat-carrying characteristics and be sufficiently low in cost that the carrying charges on the medium and the installation will not be excessive, in comparison with costs of heating by conventional means.

The heat storage media mentioned above, and others having transition points and latent heat values within the range set forth above, have properties indicated in the following table, wherein column A indicates the temperature, in degrees F., at which the medium changes from the liquid to the solid state and vice versa (i. e. the transition point), column B indicates the latent heat in gram calories per gram, column C indicates the specific gravity, and column D, obtained by multiplying the figures in column B by those in column C, indicates the latent heat in gram calories per cubic centimeter.

| Material | A | B | C | D |
|---|---|---|---|---|
| Gallium | 86 | 19.0 | 5.88 | 113.8 |
| $Na_2HPO_4.12H_2O$ | 94 | 66.8 | 1.52 | 101.5 |
| $Na_2SO_4.10H_2O$ | 90 | 57.1 | 1.46 | 83.4 |
| $Ni(NO_3)_2.6H_2O$ | 132 | 56.7 | 2.05 | 74.7 |
| $CaCl_2.6H_2O$ | 86 | 40.7 | 1.68 | 68.4 |
| $OsO_4$ | 104 | 13.5 | 4.91 | 66.3 |
| $Zn(NO_3)_2.6H_2O$ | 98 | 31.1 | 2.06 | 64.2 |
| $Ca(NO_3)_2.4H_2O$ | 108 | 33.9 | 1.82 | 61.7 |

As a practical matter, however, most of the foregoing materials are ruled out of consideration for use on any substantial scale. Hydrated sodium sulfate, as already indicated, is apt to form a precipitate which does not redissolve readily, when it goes through the transition point. Also, as already pointed out, the transition point of hydrated calcium chloride is relatively low for the most effective heat transfer to the space to be heated, unless the temperature to which said space is to be heated is relatively low (e. g. 65° F.). The same is true of gallium. From the point of view of cost, gallium and osmium tetroxide are of course out of the question for practical utilization, at least at present. Also, the three nitrates in the foregoing list are relatively too expensive for most uses. It follows, therefore, that hydrated disodium phosphate is the most suitable heat storage medium for the purposes of the present invention, although others can be used should circumstances warrant. Of these others, the hydrated calcium chloride appears to be the only one at present of commercial interest at prevailing prices.

The purposes of the present invention are accomplished by providing a body of the heat storage medium in suitable containing means, heating this medium by solar energy during sunny days, thereby storing heat in said medium, and then transferring this stored heat into the dwelling or other building to heat the same. The transfer of heat from the sun to the heat storage medium, and the transfer of heat from said medium to the building, are conveniently carried out by the use of water as the heat transfer medium, although other liquids or solutions may be used if desired. Ordinarily water will be chosen for this purpose, for reasons of cost and convenience. However, it may be desirable in some instances to use, for example, a water-alcohol or other anti-freeze mixture in the event that the heat transfer system were to be subjected to below-freezing temperatures, e. g. in a public building to which heat is to be supplied only at intervals.

A heat transfer surface is provided for receiving the solar energy. This surface should be so positioned as to be as nearly as possible at right angles to the rays from the sun at its average noonday position, at a selected time of year. This time will be selected on the basis of the amount of heat given by the sun at that time. For latitudes up to say about 40° north or south, winter would be the selected time, as sufficient heat is radiated by the sun in other seasons of the year that the heat transfer surface need not be then at right angles to the sun at noon to receive adequate heat. On the other hand, at high latitudes where not enough heat is received from the winter sun at noon by the surface when at right angles to the rays of the sun, the surface should be placed at right angles to the rays from the sun at some other time of year, e. g. spring or autumn. Heat will therefore be gathered from the sun at such seasons, and at times nearer to that when the sun is highest, but will not be gathered at times when the sun is lower, thus requiring adequate provisions for storage of heat throughout the period when the sun is too low for heat-gathering in accordance with this invention.

If the building to be heated in accordance with this invention has a roof which faces due south, and is of normal slope, the heat transfer surface may be mounted directly on the roof, or in the roof and more or less flush with it. If the roof does not face due south, or substantially so, or if its slope is too flat or too sharp, or for other reasons, the heat transfer surface may be positioned at a suitable angle to the roof, or in any other location as long as it is at a satisfactory angle to the sun's rays, as stated above.

Alternatively, as a modified arrangement, the heat transfer surface may have a "Venetian blind" configuration, wherein said surface comprises slat-shaped hollow members which can be turned or rotated so that their flat sides are at right angles, or at other selected angles, to the sun's rays at desired times. The heat transfer medium is caused to flow through such hollow members.

During sunny summer days, and also at other times of year when the weather is clear and the sun is hot enough, the heat transfer medium is circulated in heat exchange relation with the heat transfer surface, thereby becoming heated, and then in out-of-contact heat exchange relation with the body of heat storage medium, thereby transferring heat to the latter. The heat transfer medium continues this cycle as long as adequate heat is supplied by the sun.

The heat storage medium, which is a solid at temperatures below about 85° to 90° F., thereby becomes heated above its melting point, thus absorbing both latent and sensible heat. When cold weather arrives, so that it becomes necessary to heat the building in which the apparatus is installed, the heat transfer medium is caused to move in a closed circuit between the heat storage medium and heat transfer means (such as radiators) in the building to be heated.

Suitable valve, thermostat, and pump means are provided, as may be desired, to cause the heat transfer medium to flow through the desired circuits. The valves may be operated manually, or may be caused to operate by thermostats set to act at desired temperatures. The pump or pumps necessary to cause the heat transfer medium to flow where desired may also be turned on and off automatically by the thermostats. Blowers may be installed if desired to cause air in the building to circulate over the radiators, and these blowers may also be turned on and off automatically by the thermostats, if desired.

This invention will now be described in more detail by reference to the accompanying drawings, which are to be considered as illustrative of a preferred form of the invention, but not as limiting it in any way other than as expressed in the accompanying claims. In the drawings, Fig. 1 shows, more or less diagrammatically, a sectional side view of a dwelling or other building containing the apparatus of this invention;

Fig. 2 shows a sectional side view of a simple form of the heat transfer surface mounted upon a roof or other suitable exposure to the sun's rays;

Fig. 3 shows a sectional side view of a suitable reservoir for the heat storage medium, with provisions therein for circulation of the heat transfer medium and Figs. 4, 5 and 6 shows a "Venetian blind" type of heat transfer surface, wherein Fig. 4 is a top view thereof, with the glass covering removed;

Fig. 5 is an end elevation thereof, in section along the line 5—5 of Fig. 4; and Fig. 6 is a side elevation thereof, in section along the line 6—6 of Fig. 4.

Fig. 5 is on a slightly larger scale than Figs. 4 and 6.

Figure 1:
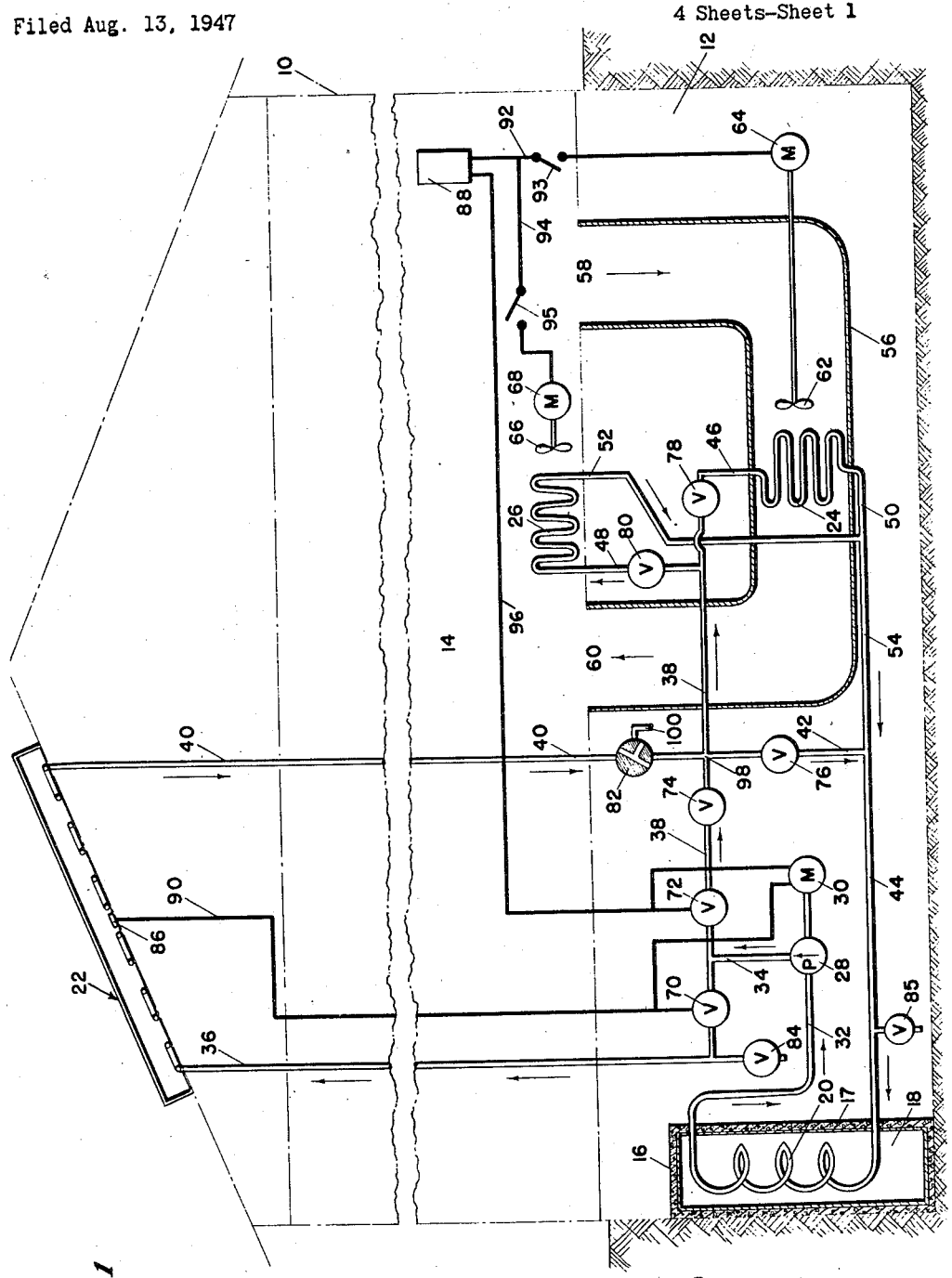
Fig. 1 is on a smaller scale than the other figures.

Referring now to Fig. 1, numeral 10 represents a dwelling or other building, having a basement 12 and living or other commonly habited quarters 14. In basement 12 is located reservoir 16 having an insulated covering 17 and filled with heat storage material 18 and containing pipes or coils 20 carrying the heat transfer medium. On the roof or in any other suitable location is placed the heat transfer surface 22 for gathering solar energy. Within building 10 are located one or more radiators or other heat transfer means (hereinafter called radiators) 24, 26. A pump 28 driven by motor 30 is provided to cause the heat transfer medium to move in the circuit desired at any particular time.

Conduit 32 leads from coils 20 to the intake of pump 28, and the outlet of pump 28 connects with conduit 34, which is provided with branches 36 and 38. Branch 36 leads to the heat transfer surface 22, through which the heat transfer medium passes, while conduit 40 is provided to convey the said medium back to coils 20 via conduit 42 and main return conduit 44. Branch conduit 38 leads to radiators 24 and 26 via branches 46 and 48 respectively. Return branch conduits 50 and 52 lead back from radiators 24 and 26 respectively to conduit 54 and thence connect with main return conduit 44.

Radiator 24 is located in air duct 56 which is conveniently located in basement 12 and is provided with inlet 58 and outlet 60. Within duct 56 is fan 62 driven by motor 64, so as to cause circulation of air from quarters 14 through duct 56 over radiator 24 and back, in heated condition, to quarters 14. Similarly, radiator 26 may be associated if desired with a fan 66 driven by motor 68 to improve heat transfer from radiator 26.

A number of different valve arrangements may be used for directing the flow of heat transfer medium through the various conduits. These valves, as well as the motors 30, 64 and 68, may be manually controlled or may be controlled by thermostats. One suitable system of valves and thermostats is shown in Fig. 1, wherein valves 70, 72, 74, 76, 78, 80, 82, 84 and 85 are provided, and thermostats 86 and 88.

Thermostat 86 is positioned in contact with heat transfer surface 22, and is set to operate at a suitable temperature as hereinafter set forth. Thermostat 88 is positioned in quarters 14 and is likewise set to operate at a predetermined temperature. Thermostat 86 is operatively connected through electrical lead 90 with motor 30 and valve 70 to actuate them. Thermostat 88 is operatively connected through electrical leads 92, controlled by switch 93, and 94, controlled by switch 95, to motors 64 and 68 respectively, and through electrical lead 96 with motor 30 and valve 72.

Valve 70 controls flow of heat transfer medium through heat transfer surface 22, while valve 72 controls the flow of said medium through all the radiators. Valves 78 and 80 control the flow of said medium to each of radiators 24 and 26 respectively. Since conduits 38, 40 and 42 have a common intersection at the X connection 98, valves 74 and 76 are also provided for better controlling the flow of heat transfer medium. If for any reason it might be desired to drain the heat transfer medium from the circuit leading to and from surface 22, or from the entire circuit, suitable drain valves such as 82, 84 and 85 may be provided. Valve 82 is a three way valve which, when turned so as to close conduit 40, causes any liquid above valve 82 to drain out through pipe 100, while pipe 100 is closed when valve 82 is set to maintain the circuit through conduit 40 open. Valves 84 and 85 are simple drain valves.

Fig. 2 shows in more detail one form of the heat transfer surface 22 and its connections, including conduits 36 and 40, thermostat 86, and lead 90 already described. This surface 22 consists of a metal plate 102 to which are thermally bonded the tubes 103 which form a closed circuit leading from conduit 36 to conduit 40. Metal plate 102 and tubes 103 are preferably provided with black, heat absorbent surfaces. Over this structure are placed the double glass panes 104, 106, which assist in maintaining high temperature within space 108 between them and plate 102. Thermostat 86 is positioned in or upon plate 102 so as to be actuated by the temperature thereof.

Fig. 3 shows in more detail a form of the storage reservoir 16. Main return conduit 44 leads to header 110, while header 112 is connected with conduit 32. Between the headers 110 and 112 is a series of connecting tubes 114. The heat transfer medium enters through main return conduit 44, passing thence into header 110 whence it is distributed via tubes 114 to header 112, wherein it is collected and passed to conduit 32 and thence out of the heat storage reservoir 16. Heat exchange takes place between the heat storage material 18 and the heat transfer material flowing in headers 110 and 112 and tubes 114. Other arrangements may of course be used, such as the coils shown in Fig. 1.

Figure 4:
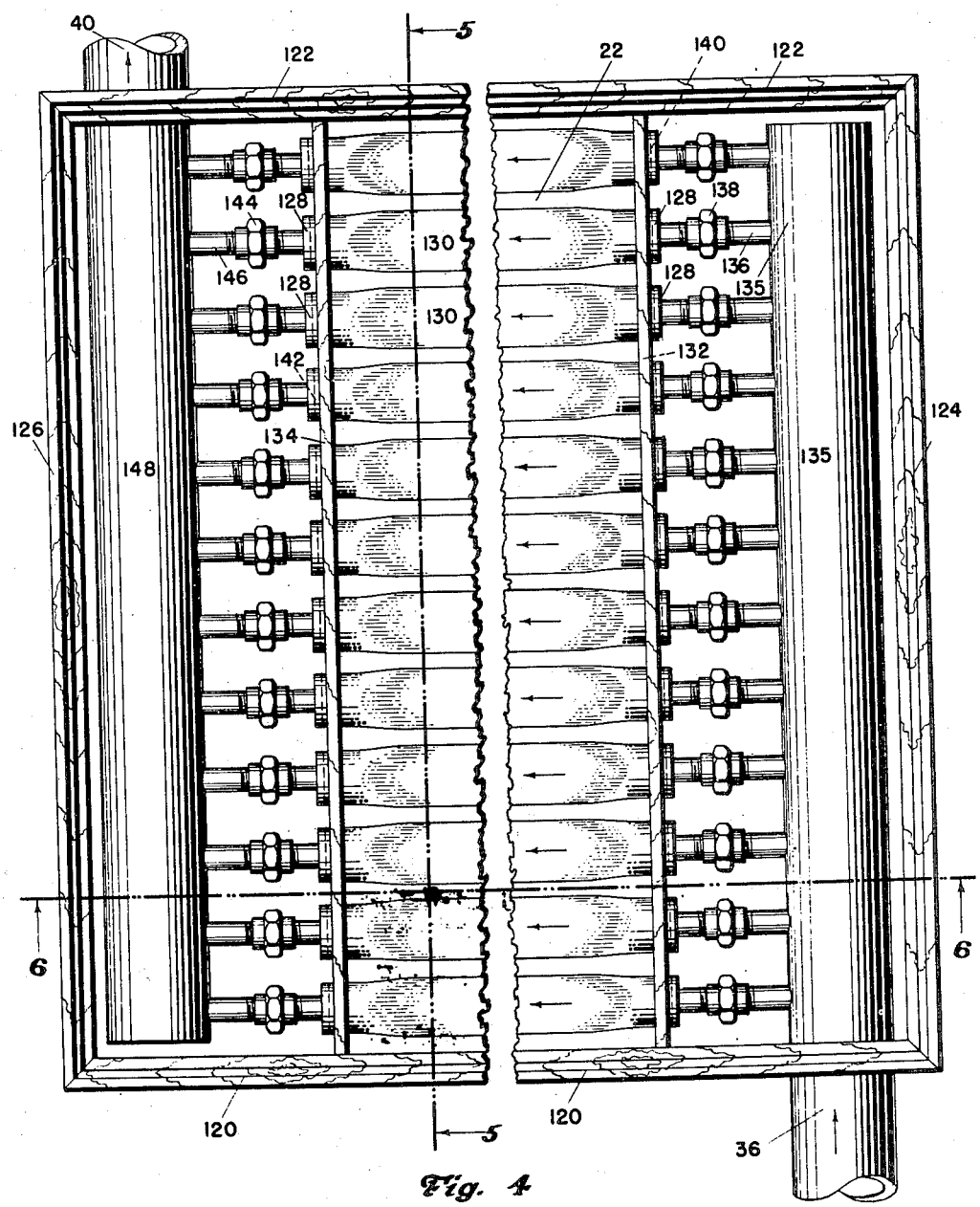
Figure 5:
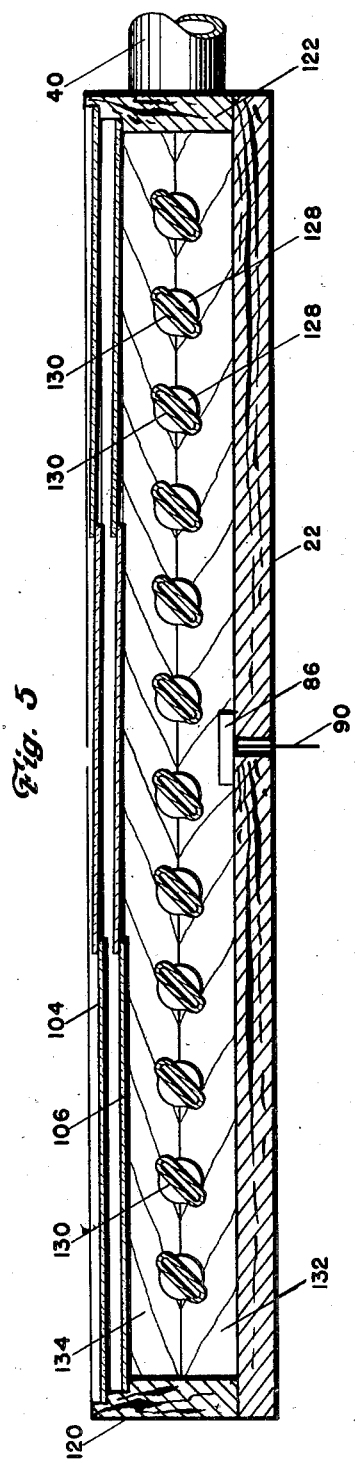
Figure 6:
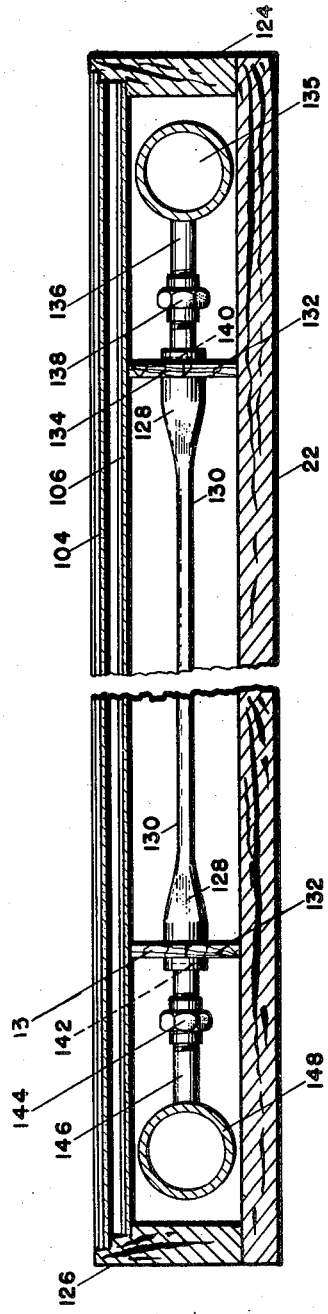

Figs. 4, 5 and 6 show the "Venetian blind" form of heat transfer surface. This arrangement comprises the surface 22 which may be placed on or adjacent the roof as already described, and which carries thermostat 86 to which lead 90 is connected, and above which are placed the double sheets of glass 104, 106, all as already described with respect to Figs. 1 and 2. These sheets of glass are supported above surface 22 by side walls 120, 122, 124 and 126. Between the glass and the surface 22 are positioned the pipes or tubes 128, which are round at each end and which are flattened throughout most of their length, as shown at 130. These pipes are rotatably supported at each end by lower supports 132, and upper supports 134, which have round holes to accommodate pipes 128. Conduit 36 for heat transfer medium is connected via header 135, nipples 136 and flare unions 138 to pipes 128, which latter are plugged at each end against escape of liquid by plugs 140 except for a hole centrally of each plug to permit passage of liquid from header 135 into the pipe. Similarly at the other end of each pipe 128 are plugs 142, flare unions 144 and nipples 146, so that the pipes may discharge into header 148 which leads to conduit 40 previously described.

The operation of the system described herein is as follows: During hot weather, when the temperature within the house or building 10 rises above normal comfort temperature of 72° F. or so, and the temperature at the heat transfer surface 22 is sufficiently high (say at least 95° F., or in any event at an operable temperature—about 5° F. or more—above the fusion temperature of the heat storage medium 18), the thermostat 86 opens valve 70 and causes motor 30 to operate pump 28. At the same time valve 72 is closed by thermostat 88, valve 76 is open, and valves 78 and 80 closed. Valves 82, 84 and 85 are, of course, closed against drainage of heat transfer medium from the system. Motors 64 and 68 are not operating, regardless of whether or not switches 93 and 95 are closed, since thermostat 88 is set so as to actuate these motors only at temperatures below normal comfort temperature in the building 10. Consequently, the heat transfer medium is impelled through conduit 36 to heat transfer surface 22, passing through pipes 103 and absorbing heat; thence said heated medium passes downward through conduits 40, 42 and 44, and to coil 20 (Fig 1), or to header 110, connecting tubes 114, and header 112 (Fig. 3), where it gives up heat to the heat storage medium 18. Then the heat transfer medium flows back through conduit 32 to to pump 28, whence it resumes the circuit.

When the sky is overcast or the weather is so cold that the temperature at surface 22 is too low to permit heat to be transferred therefrom to medium 18 above the fusion temperature of the later, thermostat 86 causes valve 70 to close. Consequently, flow of heat transfer medium to surface 22 is cut off. If the roof temperature is so low or such other conditions exist, that there is danger that the heat transfer medium in conduits 36 and 40 or at surface 22 will freeze, drain valves 82 and 84 may opened and said medium drained out. If the temperature in space 14 falls below normal comfort temperature, thermostat 88 acts to open valve 72, and to cause motor 30 to actuate pump 28. Thermostat 88 also starts motor 64, if switch 93 is closed, or motor 68, if switch 95 is closed, or both, if both switches are closed. Valve 74, and valve 78 and/or valve 80, are opened, and valve 76 closed. Consequently, heat storage medium 18 gives up heat to the heat transfer medium in coil 20 (Fig. 1) or in tubes 114 and headers 110 and 112 (Fig. 3), which latter medium then flows out through conduit 32 and is impelled by pump 28 through conduit 38 to either radiator 24 or radiator 26, or both of them, where heat is given up, and is distributed by means of fans 62 and/or 66. The heat transfer medium then returns via conduit 54 and main return conduit 44 to pick up more heat by heat exchange with medium 18. As heat is thus supplied to space 14, and the temperature therein rises above that at which the thermostat 88 is set, the latter acts to shut off motors 64 and 68, as well as motor 30, and to close valve 72. Thus, heat transfer medium ceases to flow through radiators 24 and 26, until the temperature in space 14 falls below the temperature at which thermostat 88 is set, at which time the cycle described above is repeated.

It should be noted, as already indicated, that either radiator 24, or radiator 26, with their associated conduits, motors, and fans, may be used, or both may be used. The circuits, connections, and operations obtaining when either radiator is used alone, or both are used together, will be obvious from the foregoing disclosure.

The arrangement shown in Figs. 4, 5 and 6 collects heat as already described with respect to the device of Fig. 2, except that the pipes 128 may be rotated so that thin flat surfaces 130 are at right angles (or any other desired angle) to the rays of the sun at the desired time of day and year. The pipes 128 may be turned on their axes by hand in the arrangement shown, by adjusting the flare unions, but a mechanical rotation may be provided for if desired, with the use of stuffing boxes at the points where the tubes rotate, in the conventional manner. The pipes 128 rotate between supports 132, 134, and the flare unions 138, 144 permit adjustment. The axes of these pipes 128 are preferably horizontal, for reasons which will be obvious from the present disclosure, although they may be placed at an angle to the horizontal, if desired. By this arrangement, the pipes 128 can be turned to receive the maximum amount of heat from the sun at any or all desired times of year. In Fig. 6, the flat surfaces 130 of pipes 128 are shown parallel to surface 22, while in Figs. 4 and 5 they are shown at an angle to said surface, as illustrations of different possible positions.

At some times of the year when the sun is hot enough to provide a sufficiently high temperature at surface 22, and yet the ambient temperature is such that space 14 is below the normal comfort temperature at which thermostat 88 is set, a combined operation may advantageously be used. In such operation (see Figs. 1, 2 and 3), valves 70, 78 and 80 are opened, and valves 72, 74 and 76 are closed. Valves 82, 84 and 85 are, of course, closed against drainage of heat transfer medium from the system. Accordingly, the heat transfer medium is impelled by pump 26 driven by motor 30 actuated by thermostat 86, to pass through conduit 36, tubes 103, and conduit 40 to X connection 98, and thence via conduit 38 to radiator 24 or radiator 26, or both, returning then via conduit 54 and main return conduit 44 to the heat exchange surface within reservoir 16, whence it is recirculated. Thus the heat transfer medium, heated in tubes 103, gives up part of its heat to space 14 and part of its heat to heat storage medium 18. During such periods of combined operation, the heat storage medium will frequently be at its fusion point and partly in liquid and partly in solid form. Hence, it will still have a high heat content while being capable of taking up still more heat.

It will be obvious to those skilled in this art that many other arrangements of conduits, valves, pumps, motors, radiators, fans and thermostats can be made within the scope of the present invention as defined by the appended claims. Control of the various valves and motors may be made automatic (e. g. via thermostats) to a greater or lesser degree than herein described, as may be desired.

I claim:

1. A heating system comprising, in combination, a space to be heated, a surface arranged to receive solar radiation, a single heat transfer medium, a continuous closed conduit in which said medium travels and is confined, and a reservoir containing a stable heat storage medium having a latent heat of fusion of at least 60 gram calories per cubic centimeter and a transition point at least 10° F. above the temperature to which said space is to be heated; means for causing said heat transfer medium to flow in said conduit in heat exchange relation with said surface when said surface is above a predetermined temperature and thence in said conduit into means for effecting out-of-contact heat exchange relation with said heat storage medium; and means for causing said heat transfer medium to flow in said conduit in heat exchange relation with said space to be heated when said space is below a predetermined temperature and thence in said conduit into means for effecting out-of-contact heat exchange relation with said heat storage medium.

2. A heating system in accordance with claim 1, wherein said heat storage medium is hydrated disodium phosphate, $Na_2HPO_4 \cdot 12H_2O$.

3. A heating system in accordance with claim 1, wherein said heat storage medium is hydrated calcium chloride, $CaCl_2 \cdot 6H_2O$.

4. A heating system in accordance with claim 1, wherein said surface comprises a plurality of flattened hollow tubes through which said heat transfer medium flows, said tubes being rotatably mounted about their axes and having their flat sides parallel to each other.

5. A heating system comprising, in combination, a space to be heated, a surface arranged to receive solar radiation, a single heat transfer medium, a continuous closed conduit in which said medium travels and is confined, a single heat storage medium having a latent heat of fusion of at least 60 gram calories per cubic centimeter and a transition point at least 10° F. above the temperature to which said space is to be heated, and a reservoir containing said heat storage medium; temperature-responsive means associated with said surface and effective to cause said heat transfer medium to circulate in said conduit in heat exchange relation with said surface and in out-of-contact heat exchange relation with said heat storage medium when the temperature of said surface exceeds a predetermined point and to cut off said circulation when said temperature is below said predetermined point, and temperature responsive means positioned in said space to be heated.

6. A heating system in accordance with claim 5, wherein said surface comprises a pair of headers disposed in parallel and forming a part of said continuous closed conduit, and a plurality of hollow tubes disposed in parallel with each other between said headers and arranged to convey said medium from one of said headers to the other of said headers, said tubes being mounted at their ends for rotation about their axes and being flattened throughout substantially their entire lengths with the flattened sides of each tube being parallel to each other, so that each tube may be rotated to present either one of its flattened sides toward the sun, the flattening of said tubes being sufficiently great and the spacing apart of said tubes being such that when the flattened sides are in the same plane a substantially continuous tube surface is presented in said plane.

7. A heating system comprising, in combination, a space to be heated, a surface arranged to receive solar radiation, a heat transfer medium, and a heat storage medium, said surface comprising a pair of headers disposed in parallel and a plurality of flattened hollow tubes disposed in parallel with each other between said headers and with their axes horizontal and arranged to rotate about said axes, and means for circulating said heat transfer medium from one of said headers to the other through said hollow tubes and into out-of-contact heat exchange relation with said heat storage medium to transfer heat derived from the sun from said surface to said heat storage medium, each of said tubes having its flattened sides parallel to each other, and being rotatable about its axis to permit presentation of either one of its flattened sides toward the sun, the flattening of said tubes being sufficiently great and the spacing apart of them being such that when the flattened sides are in the same plane a substantially continuous tube surface is presented in said plane.

8. A heating system in accordance with claim 5, wherein said heat storage medium consists of hydrated disodium phosphate, $Na_2HPO_4.12H_2O$.

9. A heating system in accordance with claim 7, wherein said heat storage medium consists of hydrated disodium phosphate, $Na_2HPO_4.12H_2O$.

JOHN R. SWANTON, Jr.

REFERENCES CITED

The following references are of record in the file of this patent:

UNITED STATES PATENTS

| Number | Name | Date |
|---|---|---|
| 1,768,632 | Reinhart | July 1, 1930 |
| 1,797,524 | Dwyer | Mar. 24, 1931 |
| 2,342,211 | Newton | Feb. 22, 1944 |
| 2,396,338 | Newton | Mar. 12, 1946 |

FOREIGN PATENTS

| Number | Country | Date |
|---|---|---|
| 22,900 | Great Britain | 1904 |
| 674,671 | France | Oct. 22, 1929 |